(12) United States Patent
Christodoulou et al.

(10) Patent No.: US 7,099,815 B2
(45) Date of Patent: Aug. 29, 2006

(54) METHOD OF MANAGING WORKFLOW IN A COMPUTER-BASED SYSTEM

(75) Inventors: Athena Christodoulou, Bristol (GB); Richard Taylor, Bristol (GB); Christopher Tofts, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 794 days.

(21) Appl. No.: 10/160,248

(22) Filed: Jun. 4, 2002

(65) Prior Publication Data

US 2002/0184000 A1 Dec. 5, 2002

(30) Foreign Application Priority Data

Jun. 4, 2001 (GB) .................................. 0113555.7

(51) Int. Cl.
*G06F 13/10* (2006.01)

(52) U.S. Cl. ............................................. 703/21; 707/2

(58) Field of Classification Search ................ 703/21, 703/4; 707/2–10; 718/106; 700/29–33
See application file for complete search history.

(56) References Cited

U.S. PATENT DOCUMENTS

| | | | | |
|---|---|---|---|---|
| 5,893,083 A | * | 4/1999 | Eshghi et al. ................ | 706/45 |
| 5,893,128 A | * | 4/1999 | Nauckhoff .................... | 715/511 |
| 6,065,009 A | * | 5/2000 | Leymann et al. .............. | 707/10 |
| 6,633,821 B1 | * | 10/2003 | Jackson et al. ................ | 702/56 |
| 6,826,579 B1 | * | 11/2004 | Leymann et al. ............ | 717/131 |

FOREIGN PATENT DOCUMENTS

EP 1077409 2/2001

* cited by examiner

*Primary Examiner*—Albert W. Paladini

(57) ABSTRACT

A computer network has plural computer systems, plural printers and a server. Each computer system has an application program for generating print data for the printers. The server has a workflow management program which (1) monitors and controls the flow of jobs computer systems send the printer and (2) a computer model representing the current system state. In response to a network event occurring, e.g., a hardware failure or a new print job, the program makes plural computer model copies and makes each copy perform an alternative event management operation. The program generates a set of prediction data from each computer model copy. Each set of prediction data represents a predicted future network state in response to each event management operation. A preferred event management operation is selected by comparing each generated set of prediction data with a reference set of prediction data.

15 Claims, 3 Drawing Sheets

METHOD OF MANAGING WORKFLOW IN A COMPUTER-BASED SYSTEM

RELATED APPLICATIONS

The present application is based on, and claims priority to British Application Serial Number 0113555.7, filed Jun. 4, 2001, the disclosure of which is hereby incorporated by reference herein in its entirety.

FIELD OF THE INVENTION

This invention relates to a method of managing workflow in a computer-based system, and particularly, though not exclusively, in a computer network comprising a plurality of print devices. The invention also relates to a workflow management computer system.

BACKGROUND OF THE INVENTION

The flow of data in a computer system is a complex process which requires data management. For example, a computer network comprising a plurality of computer devices will have to deal with a large number of data transfer operations over a given period of time. Taking the specific example of a computer network comprising a plurality of computer systems and a plurality of print devices (often referred to as "printers"), each computer system will usually send a large number of "print jobs" over the network to one or more of the print devices.

Data flow management may have to take account of scheduled data transfer operations. Taking the above example of the computer network having a plurality of print devices, it is common in business and commercial environments for print jobs to be sent to one or more print devices in accordance with a time-based schedule. For example, a customer may specify that a print job should be completed, at the latest, by a particular time on a particular date. Accordingly, the print job will be incorporated in a schedule of print jobs, the data flow management method aiming to ensure that each print job will be processed before, or generally about, the time specified by the customer. Conventionally, scheduling management methods are either performed manually, or utilise traditional job-shop scheduling algorithms, such as "greedy scheduling", "simulated annealing" and so on. Such conventional methods are oversimplistic, usually inaccurate (in the case of manual scheduling, a human will not be able to schedule complex jobs over an extended period), and do not cater for complex "what if scenarios", for example, "what if a new event occurs on the system, such as a hardware failure?"

SUMMARY OF THE INVENTION

According to one aspect of the present invention, there is provided a method of managing workflow in a computer-based system, the method comprising: maintaining a computer model representing the up-to-date state of the system; in response to a new event occurring in the system, making a plurality of copies of the computer model and assigning to each copy an alternative event management operation; generating a set of prediction data from each copy of the computer model, each set of prediction data representing the predicted future state of the system resulting from applying each respective event management operation; and selecting a preferred event management operation based on comparing each set of prediction data with a reference set of prediction data.

By taking a number of copies of the up-to-date state of the system, in response to a new event occurring, applying a number of alternative event management operations to the said copies, and thereafter simulating the performance of the system on the basis of each different alternative event management operation, a suitable selection can be made as to the most appropriate management operation to pursue based on the reference prediction. This selection may be based on an "oracle" predefining selection conditions which may be dependant on a user's particular requirements, for example, the need to process a particular set of data as soon as possible may be considered more important than keeping costs to a particular level.

The step of generating a set of prediction data preferably comprises modifying each copy of the computer model to take account of the new event, and thereafter simulating the resultant future operation of the modified computer model to arrive at an end-state. The step of simulating the resultant future operation of the modified computer model may involve applying a statistically-based simulation program to the modified computer model.

The step of simulating the resultant future operation of the modified computer model is preferably performed in super real-time. In this respect, it will be appreciated that in many practical situations where the computer system involves the control of physical systems (such as in the print device example given above) the simulation can be performed many times faster than the actual physical system can operate.

The reference set of prediction data may represent the predicted future state of the system in the absence of the new event occurring. Thus, the method may effectively involve comparing the outcome of applying each alternative event management operation with a set of prediction data representing the future state of the system has no event actually happened. This would provide a good gauge as to the effect that the event has had on the overall system.

The step of selecting a preferred event management operation based on comparing each set of prediction data with a reference set of prediction data may comprise selecting the event management operation resulting in prediction data which most closely matches a set of predefined selection requirements based on the reference set of prediction data. As briefly mentioned above, the system user or operator may predefine an "oracle" which sets out the preferences by which the preferred event management is selected.

Of course, having selected the preferred event management operation, the method may further comprise modifying the system and computer model to take account of the selected event management operation. This provides feedback in the system, and so the computer model, the model therefore taking the selection into account when future workflow management operations are performed.

As discussed previously, the method finds useful application where the computer model is representative of a computer network comprising a plurality of networked printing devices, the computer model representing the status of hardware devices on the network and a schedule of print jobs for processing by the printing devices. In this case, the new event in the system might relate to a new print job being introduced to the system, the alternative event management operations possibly being alternative times at which the new print job is to be processed by a printing device on the computer network. Alternatively, the new event in the system might relate to an event message being output from a hardware device on the network, the alternative event management operation relating to possible strategies for dealing with the event message. A typical event message might be an error message stating that a print device has run out of paper etc.

According to a second aspect of the invention, there is provided a computer program stored on a computer usable medium, the computer program comprising computer-readable instructions for causing a computer system to perform the steps of maintaining a computer model representing the up-to-date state of the system; in response to a new event occurring in the system, making a plurality of copies of the computer model and assigning to each copy an alternative event management operation; generating a set of prediction data from each copy of the computer model, each set of prediction data representing the predicted future state of the system resulting from applying each respective event management operation; and selecting a preferred event management operation based on comparing each set of prediction data with a reference set of prediction data.

According to a third aspect of the present invention, there is provided a computer network comprising: at least one computer; a plurality of printer devices; and a workflow management system, the workflow management system being configured to: maintain a computer model representing the up-to-date state of the computer network; in response to a new event occurring in the system, to make a plurality of copies of the computer model and to assign to each copy an alternative event management operation; to generate a set of prediction data from each copy of the computer model, each set of prediction data representing the predicted future state of the system resulting from applying each respective event management operation; and to select a preferred event management operation based on comparing each set of prediction data with a reference set of prediction data.

According to a fourth aspect of the present invention, there is provided a method of managing workflow in a computer-based system, the method comprising: maintaining a computer model representing the up-to-date state of the system; in response to a new event occurring in the system, making a plurality of copies of the computer model and assigning to each copy an alternative event management operation; generating a set of prediction data from each copy of the computer model, each set of prediction data representing the predicted future state of the system resulting from applying each respective event management operation; and selecting a preferred event management operation based on comparing each set of prediction data with a reference set of prediction data, the step of generating a set of prediction data comprising modifying each copy of the computer model to take account of the new event, and thereafter simulating the resultant future operation of the modified computer model, using a statistically-based simulation method, to arrive at an end-state.

According to a fifth aspect of the present invention, there is provided a method of managing workflow in a computer-based system, the method comprising: maintaining a computer model representing the up-to-date state of the system; in response to a new event occurring in the system, making a plurality of copies of the computer model and assigning to each copy an alternative event management operation; generating a set of prediction data from each copy of the computer model, each set of prediction data representing the predicted future state of the system resulting from applying each respective event management operation; and selecting a preferred event management operation based on comparing each set of prediction data with a reference set of prediction data, the step of generating a set of prediction data comprising modifying each copy of the computer model to take account of the new event, and thereafter simulating, in super real-time, the resultant future operation of the modified computer model, using a statistically-based simulation method, to arrive at an end-state.

According to a sixth aspect of the invention, there is provided a workflow management computer system for connection to a computer network, the computer system being configured to operate under the control of a computer program comprising computer-readable instructions for causing a computer system to perform the steps of maintaining a computer model representing the up-to-date state of the system; in response to a new event occurring in the system, making a plurality of copies of the computer model and assigning to each copy an alternative event management operation; generating a set of prediction data from each copy of the computer model, each set of prediction data representing the predicted future state of the system resulting from applying each respective event management operation; and selecting a preferred event management operation based on comparing each set of prediction data with a reference set of prediction data, the step of generating a set of prediction data comprising modifying each copy of the computer model to take account of the new event, and thereafter simulating the resultant future operation of the modified computer model, using a statistically-based simulation method, to arrive at an end-state.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
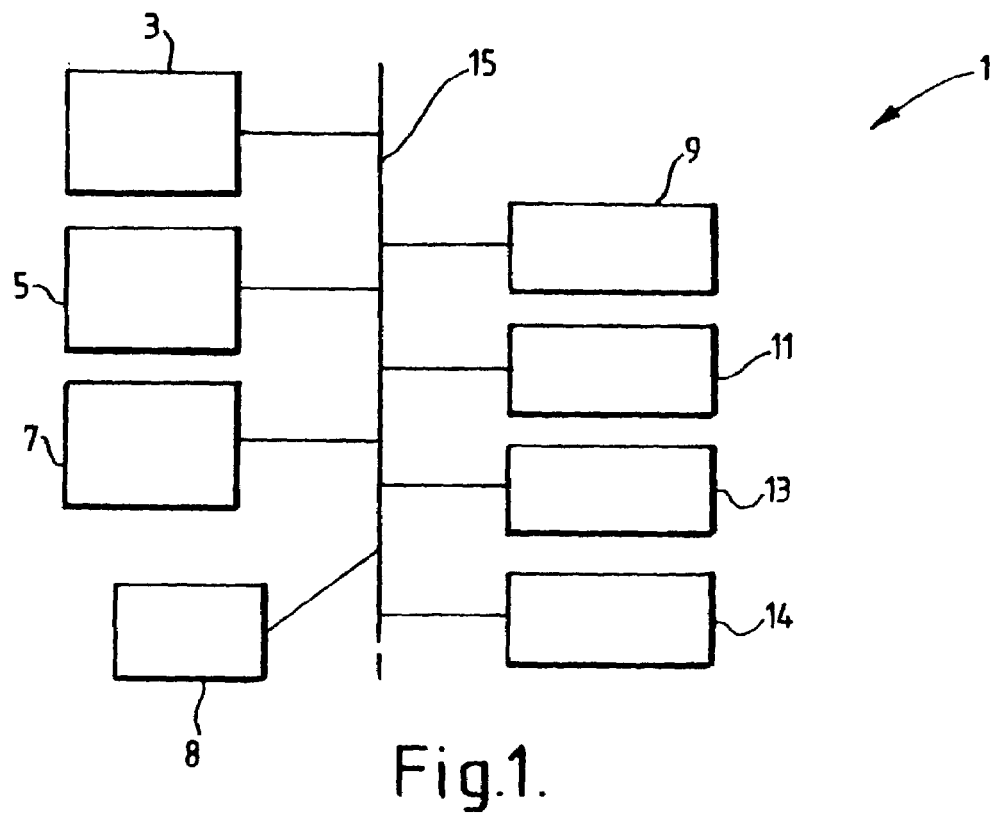
FIG. 1 is a block diagram representation of a computer network having a plurality of computer systems and a plurality of print devices.

Referring to FIG. 1, a computer network 1 comprises first, second, and third computer systems 3, 5, 7 connected to first, second, third and fourth print devices 9, 11, 13, 14 by means of a network connection 15. Each computer system 3, 5, 7 comprises at least one application program capable of generating print data for output to one or more of the print devices 9, 11, 13, 14. Print data relating to print jobs is output from each application program and stored on a print spooler (not shown) forming part of each computer system 3, 5, 7. A server 8 is also connected to the network connection 15, the server comprising a workflow management program which monitors and controls the flow of print jobs which are sent by the first, second, and third computer systems 3, 5, 7.

Figure 2:
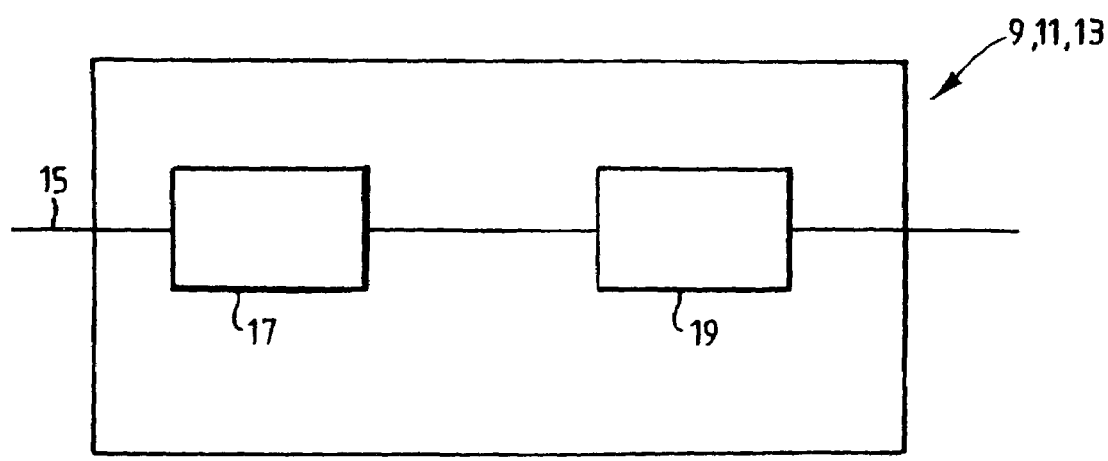
FIG. 2 is a block diagram representation of the constituent parts of each print device shown in FIG. 1.

Referring now to FIG. 2, each of the print devices 9, 11, 13, 14 comprises a so-called raster-image processor (RIP) 17 and a print engine (PE) 19. As would be understood by those skilled in the art, the RIP 17 processes incoming print data by converting the data into a file representing the graphical output, e.g. a bitmap file. This processed print data is then passed to the PE 19 which converts the processed data into the electrical signals required to drive the physical mechanisms of the print device, e.g. the drum of a laser printer, or the carriage/ink nozzles of an inkjet printer. It will also be understood that, in certain circumstances, a print device may output processed print data to a PE 19 which belongs to a different print device. For example, once print data has been processed by the RIP 17 of the print device 9, the processed print data could be sent to the PE 19 of the print device 11. It should also be appreciated that other print devices could be included on the network 1, for example print devices simply consisting of a RIP 17 and some local memory (there being no PE 19). In this case, the processed print data would have to be sent to the PE 19 of one of the other print devices 9, 11, 13, 14.

In this embodiment, the computer network 1 shown in FIG. 1 is utilised as a commercial printing system. Customers request print jobs to be generated which meet certain requirements, such as the latest time when the print job can be delivered to them, or the cost of the print job. Indeed, some customers may require the print job to meet both time and cost requirements. In order to cater for customer requirements, the workflow management program on the server 8 maintains an up-to-date system model of the performance of the overall computer network 1, the model comprising sub-models relating to the current schedule of print jobs, the current state of the hardware components of the computer network, and the costs involved. It will be appreciated that the term "up-to-date" does not necessarily require the computer model to reflect the exact current state of the computer network, it being likely that some delay will have to be accounted for. The model can be programmed in SIMULA or in DEMOS2000 running under the D2K environment.

Figure 3:
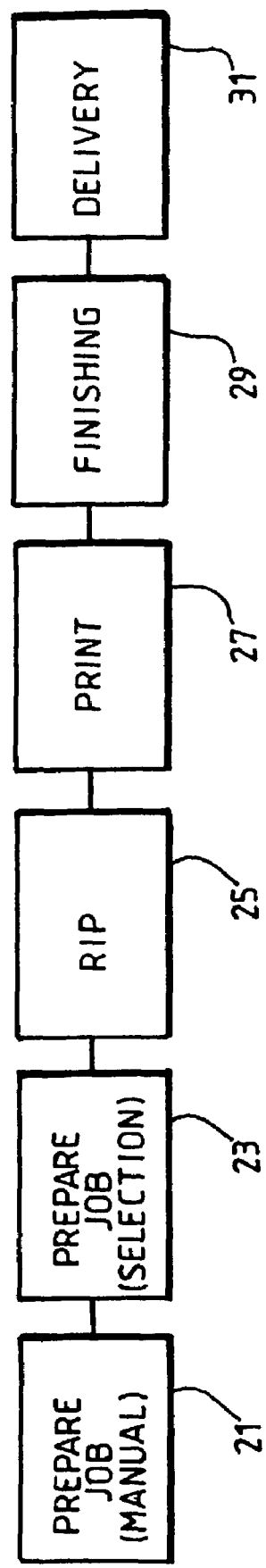
FIG. 3 shows the various stages of a typical print-process life-cycle.

A generalised view of the life-cycle of a typical print job is shown in FIG. 3. The first two steps 21, 23 represent the preparation stages of the print job, this being performed in one of the computer systems 3, 5, 7. In step 25, once the print job is output from the relevant computer system 3, 5, 7 it is passed to one of the print devices 9, 11, 13, 14 where the data first enters the RIP 17. In step 27, the processed print data is passed to the PE 19 (which, as mentioned above, may be the PE of the same print device, or a PE in a different print device) which generates the hard-copy output of the print job. In step 29, the hard copy output may be passed to a finishing device, such as a stapler, binder or laminator. Finally, in step 31, the hard-copy (possibly with 'finishing') is delivered to the customer.

The various sub-models making up the model of the overall computer network 1 monitor the behaviour and performance of each part of the life-cycle shown in FIG. 3. For example, it will be appreciated that, at any given time, different print jobs will be present at different stages of the life-cycle, and different hardware devices may have different settings or characteristics.

During the normal operation of the computer network 1, it is likely that "events" will occur which will affect the current and future operation of the computer network 1. Such events may simply relate to new print jobs being introduced to the print job schedule, or perhaps to some hardware event, such as a print device failing or running out of available paper. Of course, in this embodiment wherein customers specify time and cost requirements, the occurrence of such events may seriously affect the operation of the computer network 1 such that the customer's requirements will not be met unless some form of workflow management is performed. In this case, this is catered for by the server 8 running the network management program, the operation of which is described below.

Figure 4:
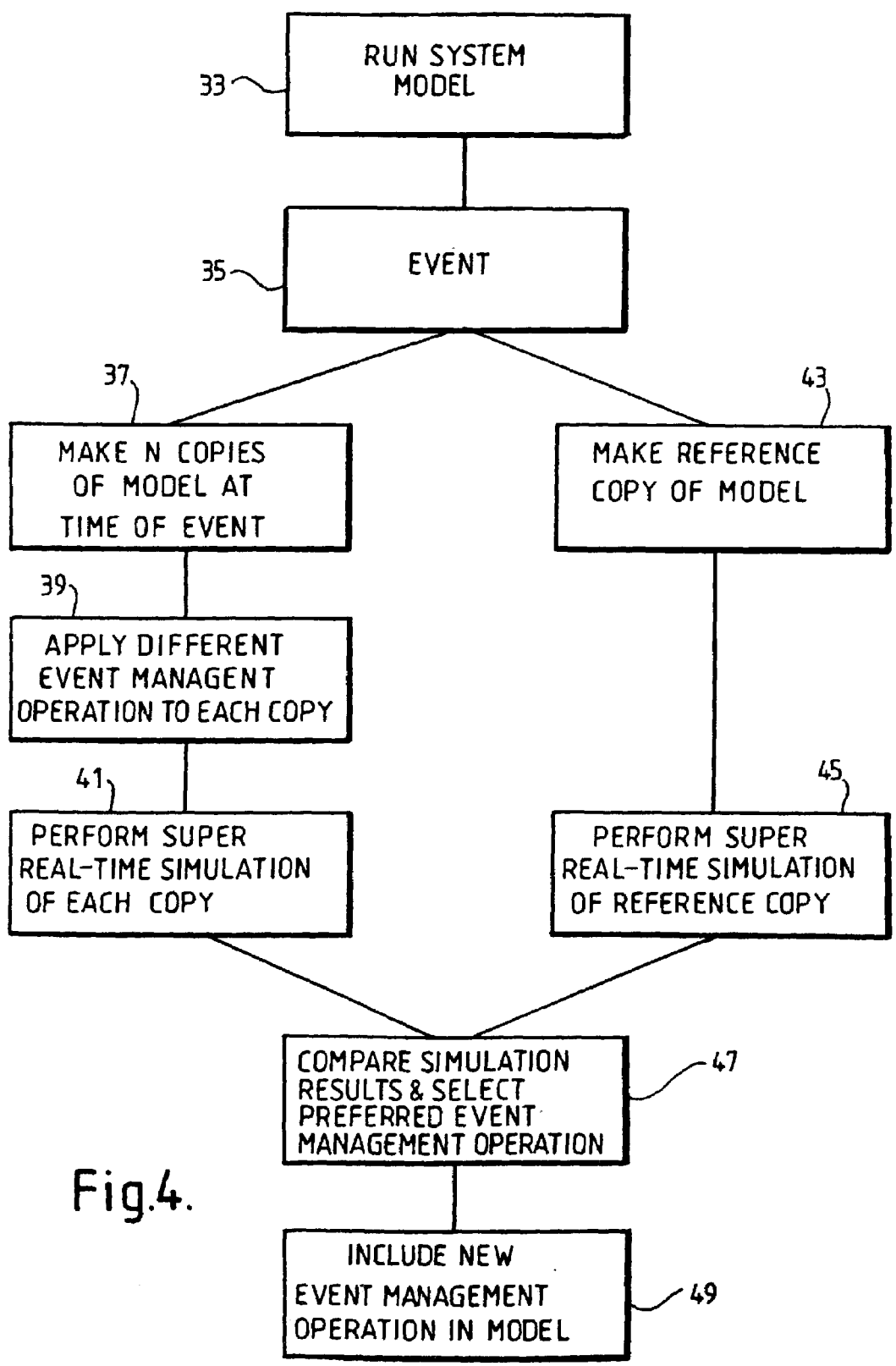
FIG. 4 shows the stages of operation of an event management program for controlling the flow of print jobs in the computer network of FIG. 1.

The overall operation of the network management program is represented in FIG. 4. In an initial step 33, the system model is run, i.e. to maintain an up-to-date model of the computer network 1. Step 35 represents the occurrence of an event on the computer network 1, such as a hardware failure or a new print job. At this time, in step 37, the network management program operates to make a predetermined number of copies of the current state of the system model, say, ten copies, which represent a "snapshot" of the system at the instant in time when the event occurred on the system model. At the same time, in step 43, a further reference copy of the system model's current state is taken. Next, in step 39, a different event management operation is applied to each of the ten copies of the system state taken in step 37. These event management operations effectively comprise alternative options or strategies for dealing with the occurrence of the event, and may be specified manually, or may be provided as a list of predefined options which are selected from a pull-down menu. As a general example of an event management operation, the option to delay a particular print job for a period of time so as to allow a new urgent print job to be processed, is one possibility.

In step 41, a super real-time simulation is performed for each of the different copies (to each of which has now been applied a respective event management operation). This simulation generates a set of prediction data representing a predicted end-state of the system as a result of each event management operation being applied. The simulation is performed in 'super real-time' in the sense that the simulation can be completed at a much faster rate that the actual events in the computer network 1 will occur (hence, it is a prediction of the future state of the computer network 1). The simulation ends at the point where the system model requires more input data. In step 45, a super real-time simulation is also performed on the reference copy of the model taken in step 43. The resultant set of prediction data is used to represent the predicted end-state of the computer-network 1 (up to the point that new input is required) had the new event not occurred.

The simulation steps 41, 45 are performed using conventional system simulation algorithms which use statistical data (usually acquired and averaged over many thousands of previous operations).

In step 47, one of the event management operations is selected based on a predefined "oracle" of selection criteria. This is performed on the basis of comparing the results from each simulation performed in step 41 with the result of the simulation performed in step 45, i.e. on the reference copy of the model. Finally, in step 49 the selected event management operation is used in the actual computer network 1 which thus becomes modified. Accordingly, the selected event management operation is incorporated into the system model which continues to operate as before.

To further illustrate the operation of the network management program, the following example assumes that the first print device 9 is a black and white printer, and the second to fourth print devices 11, 13, 14 are colour printers.

The following print jobs are present on the system.

First print device 9:
(Job #312, 30 pages, BW, 10 copies), (9 done, ETF 20 mins).

Second print device 11:
(Job #332, 10 pages, colour, 2 copies, needed 40 minutes), (0 done, ETF 5 minutes);
(Job #442, 15 pages, colour, 4 copies, needed 700 minutes), (ripped, TTP 12 minutes).

Third print device 13:
(Job #382, 30 pages, colour, 20 copies, needed 300 minutes), (0 done, ETF 245 minutes).
Fourth print device 14:
(Job #387, 5 pages, colour, 20 copies, needed 300 minutes), (0 done, ETF 15 minutes);
(Job 452, 18 pages, colour, 10 copies), (ripped, TTP 20 minutes).

Regarding the notation used, the first set of brackets encloses the so-called 'job-ticket' of the print job, and the second set of brackets encloses the 'job status'. Jobs may specify a 'needed' time, i.e. the time when the customer has asked for them to be ready. 'Ripped' means that the print job has been acquired from a spooler and has been processed by the RIP 17 of the relevant print device. ETF means 'estimated time to finish' i.e. to finish the print job, whilst TTP means 'time to print' i.e. to print the print job.

Referring back to FIG. 4, step 35, when an event occurs, for example the second print device 11 crashes, in step 32, five copies are made of the current state of the system, i.e. the state of the four print devices 9, 11, 13, 14 stated above. A reference copy is also made, as in step 43.

In step 39, five different event management operations are applied to each copy, these being:
(1) move job #332 to the first print device 9, stalling job #382;
(2) move job #332 to the third print device 13, after job #382;
(3) move job #332 to the fourth print device 14, stalling job #387;
(4) move job #332 to the fourth print device 14, stalling job #387; and
(5) move job #332 to the fourth print device 14, stalling job #452.

Note that this example only looks at job #332. Of course, in a more complex model, job #442 will also have to be moved, which will require much more complex analysis.

In step 41 a super-real time simulation is made to predict the outcome of each of the above event management operations. Of course, this should be performed using a known simulation application which is capable of handling more complex problems, but the following illustrates the likely outcome in this simple example. In the case of option (1), job #332 has only 5 minutes to finish, and so the likely outcome will be that the job can be completed prior to the 'needed' time of job #382 which will take 245 minutes to finish. In (2), job #332 will be printed well after its 'needed' time of 40 minutes, since the ETF of job #382 is 245 minutes. In (3) job #332 has only 5 minutes to finish, and so will allow the 'needed' time of job #387 (300 minutes) to be met (it having an ETF of only 15 minutes). In (4) job #332 will meet its 'needed' time of 40 minutes if moved after job #387 (which has an ETF of 15 minutes) but may slightly affect job #452 which has a TTP of 20 minutes (print job #332 being started, in this case, 5 minutes prior to this TTP of 20 minutes and having an ETF of 5 minutes). Finally, in (5) the time to complete printing job #442 is difficult to predict since there is no ETF, but it is known that it will start printing in 20 minutes. Since job #332 is needed in 40 minutes, this target will only be met if the time taken to print the job is less than 20 minutes.

In step 45, the simulation of the reference copy of the model will essentially generate the future state of the system had the failure of the second print device 11 not occurred, i.e. so in the simulation, jobs #332 and 442 will be treated as if printed on the second print device 11. Then, in step 47, a selection is made as to which of the five event management operations to choose, based on a comparison with the reference simulation from step 45. The selection is made according to an 'oracle' which specifies particular selection criteria. Thus, for example, if the selection criteria was to choose an operation which resulted in all print jobs being completed no later than ten minutes after the time they would have been completed had no event occurred, then event management operations (2), (4) and (5) would not be used since they would result in job #332 being printed well after the time of fifteen minutes from now (i.e. since the ETF of job #332 is five minutes). The stalling operations of (1) and (3) would obviously meet the criteria. The choice of between (1) and (3) may be based on some further criterion. Whatever operation is chosen, this is entered into the system i.e. the operation specified in (1) or (3) is actually performed, and the model updated to take account of this change.

As mentioned previously, by taking a number of copies of the up-to-date state of the system, in response to a new event occurring, applying a number of alternative event management operations to the said copies, and thereafter simulating the performance of the system on the basis of each different alternative event management operation, a suitable selection can be made as to the most appropriate management operation to pursue based on the reference prediction.

What is claimed is:

1. A method of managing workflow of a computer-based system, the method being performed with the aid of a computer model representing an up-to-date state of the system, the method comprising:
responding to a new event occurring in the system by making a plurality of copies of the computer model and assigning to each copy a different possible event management operation;
generating a set of prediction data for each copy of the computer model by modifying each copy of the computer model to take account of the new event, and thereafter simulating the resultant future operation of each copy of the modified computer model to arrive at a different simulated end-state for each copy of the modified computer model, wherein each set of prediction data represents a different predicted future state of the system resulting from applying each respective event management operation;
and selecting a preferred event management operation based on comparing each set of prediction data with a reference set of prediction data.

2. A method according to claim 1, wherein the step of simulating the resultant future operation of the modified computer model includes applying a statistically-based simulation program to the modified computer model.

3. A method according to claim 1, wherein the step of simulating the resultant future operation of the modified computer model is performed in super real-time.

4. A method according to claim 1, wherein the reference set of prediction data represents the predicted future state of the system in the absence of the new event occurring.

5. A method according to claim 4, wherein the step of selecting a preferred event management operation based on comparing each set of prediction data with a reference set of prediction data comprises selecting the event management operation resulting in prediction data which most closely matches a set of predefined selection requirements based on the reference set of prediction data.

6. A method according to claim 1, the method further comprising: after selecting the preferred event management operation, modifying the system and computer model to take account of the selected event management operation.

7. A method according to claim 1, wherein the computer model is representative of a computer network comprising a plurality of networked printing devices, the computer model representing the status of hardware devices on the network and a schedule of print jobs for processing by the printing devices.

8. A method according to claim 7, wherein the new event in the system relates to a new print job being introduced to the system, the different event management operations being different times at which the new print job is to be processed by a printing device on the computer network.

9. A method according to claim 7, wherein the network includes at least three printing devices, and the new event is a failure of one of the printing devices, and the different event management operations include shifting printing jobs to the printing devices that have not failed.

10. A method according to claim 7, wherein the new event in the system relates to an event message being output from a hardware device on the network, the different event management operations relating to possible strategies for dealing with the event message.

11. A computer program stored on a computer usable medium, the computer program comprising computer-readable instructions for causing a computer system to perform the steps of the method according to claim 1.

12. A workflow management computer system for connection to a computer network, the computer system being configured to operate under the control of the computer program of claim 10.

13. A computer network comprising: one or more computer arrangements; a plurality of printer devices; and a workflow management system, the workflow management system being configured:

(a) to maintain a computer model representing the up-to-date state of the computer network;
(b) to respond to a new event occurring in the system, to make a plurality of copies of the computer model and to assign to each copy a different possible event management operation;
(c) to generate a set of prediction data for each copy of the computer model by
   (i) modifying each copy of the computer model to take account of the new event, and
   (ii) thereafter simulating the resultant future operation of the modified computer model to arrive at an end-state, each set of prediction data representing a different predicted future state of the system resulting from applying each respective event management operation;
(d) to compare each set of production data with a reference set of prediction data; and
(e) to select a preferred event management operation based on (d).

14. The network of claim 13, wherein the new event in the system relates to a new print job being introduced to the system, the different event management operations being different times at which the new print job is to be processed by a printing device on the computer network.

15. The network of claim 13, wherein the network includes at least three printing devices, and the new event is a failure of one of the printing devices, and the different event management operations include shifting printing jobs to the printing devices that have not failed.

* * * * *